Jan. 15, 1963

H. BOCK 3,073,421

RETAINING DEVICE

Filed June 23, 1961

INVENTOR
HENRY BOCK

BY *Fisher Christen & Goodson*
ATTORNEYS

United States Patent Office 3,073,421
Patented Jan. 15, 1963

3,073,421
RETAINING DEVICE
Henry Bock, 930 Park Ave., Elizabeth, N.J.
Filed June 23, 1961, Ser. No. 119,076
4 Claims. (Cl. 189—88)

This invention relates to an improved device for fixedly retaining semi-rigid insulation boards to horizontally disposed structural members and specifically relates to a device for use with a surface equipped with a bulb-T purlin of known design.

There are methods well known in the construction field for retaining insulation boards against a surface by utilizing spring clips in conjunction with a bulb-T device. However, when used in great quantities, the spring clips of the prior art amount to a considerable expense to the builder. Therefore, the principal objective of this invention is to provide a retaining device for use with a bulb-T, which appreciably reduces the cost of such devices.

Another important objective of this invention is to provide an improved retaining device which is used in combination with a staple.

A further objective of this invention is to provide a retainer or anchoring assembly that does not require a spring clip of resilient or tempered metal, but uses a clip of less expensive construction such as malleable or ductile materials.

A still further objective is to provide a retaining device for insulation boards with superior holding and positive locking qualities not heretofore obtained in the building field.

Another important objective of the invention is the provision of an improved assembly for securing adjacent insulation boards in fixed lateral and vertical relationship to the beams by which they are supported.

Further objectives and advantages of the invention will be apparent from the attached drawings, the following description and claims, wherein the construction, arrangement and cooperation of the several parts of the invention are set forth.

Figure 1:
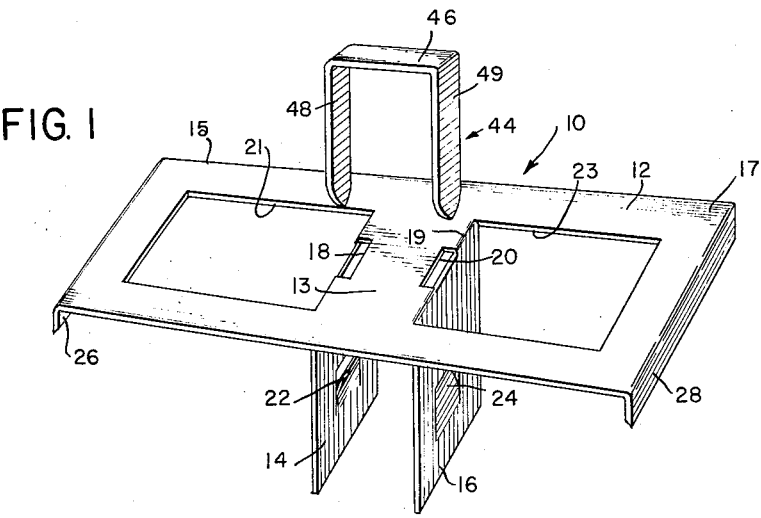
FIG. 1 is an exploded perspective view of the retainer and staple used in this invention.

Referring now to the drawings, where like numerals indicate like parts, the numeral 10 indicates a retainer assembly. The retainer itself is comprised of a plate 12 from which two parallel extensions 14 and 16 depend. The extensions are struck from plate 12 and are bent outwardly in the same direction along lines 17 and 19. The plate is thereby divided into a mid-section 13, and two end sections 15 and 17. The end sections 15 and 17 respectively include a pair of openings 21 and 23 which were formed through the vacating of extensions 14 and 16. A pair of staple receiving apertures 18 and 20 are provided slightly inwardly of, and adjacent to the junction lines 17 and 19.

The extensions 14 and 16 are, in turn, struck with inwardly directed grab arms 22 and 24 respectively. At the outer ends of plate 12 are a pair of downwardly projecting flanges 26 and 28.

Figure 2:
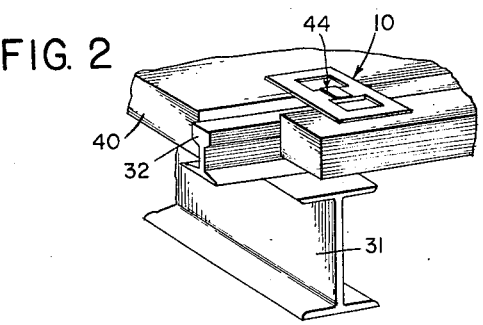
FIG. 2 is a partial perspective view of a ceiling equipped with a bulb-T to which the retainer of this invention is attached.
Figure 3:
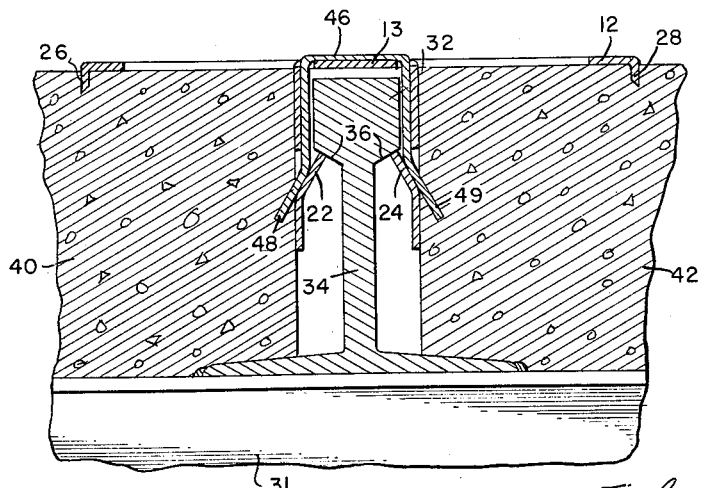
FIG. 3 is an assembled cross-sectional view.

As best seen in FIG. 2, a bulb-T 30 is welded to the upper surface of I-beam 31. The bulb-T is of conventional design and is a sub-purlin or auxiliary member used to span the distance between the main support beams 31. The T is formed with an enlarged head 32 which tapers into a stem or shank section 34. The taper provides a bearing shoulder 36 upon which the retaining device is secured. A series of parallel bulb-T's are secured across the I-beams at intervals equal to the width of the insulation boards used. The T's are fastened to the surface in any conventional manner, such as at welds 33.

The gist of the invention can best be observed through its operation, which is quite simple. A pair of insulation boards 40 and 42 are placed in parallel side-by-side relationship across and extending between parallel I-beams, and receive the bulb-T 30 therebetween. The insulation boards are held snugly against the bulb-T. The legs 14 and 16 of clip 10 are slipped over the head 32 until the lower surface of plate 12 is resting on the upper surfaces of boards 40 and 42 and flanges 26 and 28 are forced therein. At this point the legs 14 and 16 are between the bulb-T and the insulation boards and grab arms 22 and 24 are pointing toward the bulb-T.

A staple 44 is provided to actuate the clipping action. The staple is of conventional design and is comprised of a base 46, and parallel sharpened legs 48 and 49. After the clip is positioned staple 44 is driven into slots 18 and 20. The slots 18 and 20 guide the legs 48 and 49 along the interior of extensions 14 and 16 until the legs contact the upwardly and inwardly tapering surfaces of grab arms 22 and 24.

As best seen in FIG. 2, the staple is driven home either mechanically or by hammer, during which movement the legs 48 and 49 cam the arms 22 and 24 inwardly to a point where they firmly grip the tapered shoulder 36. Concurrent with this camming action, the staple legs are bent outwardly slightly into the insulation boards 40 and 42. The force of grab flaps 22 and 24 against shoulder 36 (opposing the force between portion 13 and base 46) and thereby secures the plate 12 to the bulb-T. The insulation boards 40 and 42 are thus locked securely to the bulb-T. This is efficiently accomplished even though a retainer which does not demand a great deal of resiliency is used. Such clips may be manufactured of a low grade, ductile metal without affecting overall performance.

In a general manner, while I have, in the above description, disclosed what I deem to be practical and efficient embodiments of my invention, it should be well understood that I do not wish to be limited thereto, as there might be changes made in the arrangement, disposition and form of the parts without departing from the principle of the present invention as comprehended within the scope of the accompanying claims.

I claim:

1. A clip for retaining semi-rigid insulation boards to a bulb-T extending between support beams, said T having a base affixed to said support beams, an enlarged head, a stem connecting said base to said head, and said stem having a tapered shoulder merging with said head and said insulation boards having edges abutting on each side of said bulb-T; that improvement in a retainer, comprising a plate extending partially over one surface of said abutting edges of each of said boards, two parallel extensions struck from said plate and bent outwardly forming a pocket which receives said head, each of said extensions having inwardly directed flaps struck therefrom and angularly disposed toward said head and forming slots in each of said extensions, said plate having a pair of apertures at the junction between said extensions and said plate, a staple having each of its legs projecting through one of said pair of apertures into said pocket and each leg extending outwardly through one of said slots, the distance between the legs of said staple being less than the distance between said extensions whereby said extensions are forced toward each other against said shoulders.

2. A clip for retaining semi-rigid insulation boards to the upper surface of I-beams equipped with a bulb-T, said bulb-T having a base affixed to said I-beams, an enlarged head, and a stem connecting said base to said head, said stem having a tapered shoulder merging with said head, and said insulation boards bearing on said I-beams and having edges abutting on each side of said bulb-T, a retainer assembly comprising in combination, a plate extending over the edges of each of said boards, two parallel extensions struck from said plate and bent outwardly away from said surface forming a pocket which receives said head, each of said extensions having inwardly and upwardly directed flaps struck therefrom and angularly disposed toward said plate, said extensions having slots where said flaps were struck, said plate having a pair of apertures inwardly of the junction between said extensions and said plate, a staple having each of its legs projecting through one of said apertures into said pocket and each leg extending outwardly through one of said slots, the distance between the legs of said staple being less than the distance between said extensions whereby said extensions are forced toward each other against said shoulders.

3. The invention as described in claim 2 wherein said retainer is made of a ductile metal.

4. The invention as described in claim 3 wherein said legs of said staple are cammed into said boards.

References Cited in the file of this patent

UNITED STATES PATENTS 2,780,850 Lieff _____ Feb. 12, 1957